US005956680A

United States Patent [19]

Behnke et al.

[11] Patent Number: 5,956,680

[45] Date of Patent: Sep. 21, 1999

[54] VIRTUAL AUDIO GENERATION AND CAPTURE IN A COMPUTER

[75] Inventors: Eric J. Behnke, Boulder, Colo.; Thomas B. Brightman, Dallas, Tex.

[73] Assignee: National Semiconductor Corporation, Santa Clara, Calif.

[21] Appl. No.: 08/857,809

[22] Filed: May 16, 1997

Related U.S. Application Data

[63] Continuation of application No. 08/458,326, Jun. 2, 1995, abandoned.

[51] Int. Cl.[6] ................................ G01L 5/02; G01L 9/00; G10H 7/02

[52] U.S. Cl. ............................ 704/258; 704/201; 84/602

[58] Field of Search .................................... 395/2.67, 2.1, 395/2, 2.87, 2.79, 500; 84/602, 603, 604, 622, 660, 1.01

[56] References Cited

U.S. PATENT DOCUMENTS

| | | | |
|---|---|---|---|
| 4,018,121 | 4/1977 | Chowning | 84/1.01 |
| 4,249,447 | 2/1981 | Tomisawa | 84/1.01 |
| 4,514,805 | 4/1985 | McDonough et al. | 395/734 |
| 4,812,975 | 3/1989 | Adachi et al. | 395/500 |
| 4,885,681 | 12/1989 | Umeno et al. | 395/406 A |
| 5,155,838 | 10/1992 | Kishi | 395/500 |
| 5,175,853 | 12/1992 | Kardach et al. | 395/733 |
| 5,455,909 | 10/1995 | Blomgren et al. | 395/183.19 |
| 5,560,002 | 9/1996 | Kardach et al. | 395/555 |
| 5,590,312 | 12/1996 | Marisetty | 395/500 |

OTHER PUBLICATIONS

Chips and Technologies, Inc., CHIPSystem Architecture, "The SuperState Architecture", Oct. 1991, pp. 15–25.

Microprocessor Report, "PC/Chip Provides High Integration, Rich Power–Management Features", by Mark Thorson, Oct. 16, 1991, pp. 14–17.

Microprocessor Report, "The Intel System Management Mode", by Simon C. Ellis, Feb. 12, 1992, pp. 16–19.

*Primary Examiner*—Forester W. Isen
*Assistant Examiner*—Patrick N. Edouard
*Attorney, Agent, or Firm*—John L. Maxin

[57] ABSTRACT

A system and method of virtualized audio generation and capture in a computer system is disclosed employing the native central processing unit and a system management mechanism, to generate and capture music and other sound effects, responsive to events occurring in an application program executed by the native central processing unit or to input buffer percentage full signals.

26 Claims, 12 Drawing Sheets

VIRTUAL AUDIO GENERATION AND CAPTURE IN A COMPUTER

The present application is a file wrapper continuation of copending application Ser. No. 08/458,326, filed Jun. 2, 1995, now abandoned.

BACKGROUND OF THE INVENTION

1. Field of the Invention

The invention relates generally to generating and capturing music and other sound effects, and more particularly to a complex system and method of virtualized audio generation and capture in a computer.

2. Description of Related Art

Audio is a key ingredient in creating multimedia presentations on a computer system. Unfortunately, the original IBM PC/AT and compatibles (a.k.a. "PCs") which set a de facto standard for personal computers, came equipped only with primitive means for producing sound. More specifically, the PC typically produced sound by varying the frequency of a square wave oscillator to a speaker—simulating only the most rudimentary of musical instruments and sound effects.

Early software developers, especially game developers, began searching for an economical way to improve the audio capabilities of the PC. Several after-market expansion audio cards emerged—the most widely adopted being the so-called "Sound Blaster™" card from Creative Labs Corporation of Milpitas, California. The Sound Blaster™ card utilized so-called "frequency modulation" (a.k.a. FM) synthesis to simulate musical instruments and other sound effects. To facilitate this FM synthesis, the Sound Blaster™ card employed a dedicated FM synthesizer integrated circuit commonly referred to as an OPL-2 chip from the Yamaha Corporation of Japan.

The FM synthesis technique for producing music and other sound effects is described in the *Journal of the Audio Engineering Society*, September 1973, entitled "The Synthesis of Complex Audio Spectra by Means of Frequency Modulation" by Chowning, and in U.S. Pat. No. 4,018,121, entitled "Method of Synthesizing a Musical Sound", issued Apr. 19, 1977, to Chowning. A variation on the teachings of Chowning employing feedback techniques to create more complex timbres is described in U.S. Pat. No. 4,249,447, entitled "Tone Production Method For An Electronic Musical Instrument", issued Feb. 10, 1981, to Tomisawa. The closed-loop feedback methods described in Tomisawa however, suffer from a number of drawbacks including, but not limited to, being processor intensive and requiring additional hardware not normally found in a computer system.

In the implementation of FM synthesis on the Sound Blaster™ card, the so-called "carrier" and "modulator" waveforms along with other defining waveform characteristics, are programmably generated through reads and writes to registers and are then selectively mixed together and fedback in some fashion, to form a resultant complex waveform with adjustable timbres. The Sound Blaster™ card, which mapped these registers to a specific I/O address space in the PC, gave rise to a de facto standard for application programs which chose to employ this scheme of FM synthesis. Consequently, over the years a vast body of software developed which adhered to this de facto standard that defined the particular I/O space used for sound synthesis.

Other PC sound cards emerged which were "compatible" with the Sound Blaster™ sound card (to the extent of the defined I/O space) but which didn't use a dedicated FM synthesizer integrated circuit. Instead, a general purpose coprocessor or digital signal processor (a.k.a. DSP) was used which acted in response to "trapped" I/O addresses generated by an application program running on the PC, to provide the appropriate sound response. The coprocessor or DSP would process the information written to the defined I/O address space (typically through some type of recursive digital filter) to generate a musical sound.

While the coprocessor or DSP approach is meritorious in the sense that it can be programmably upgraded to use new and better recursive filters, it tends to be a more expensive approach than a dedicated FM synthesizer integrated circuit. Moreover, the lack of standards for general purpose coprocessors or DSPs has prevented the PC industry from providing an empty "upgrade" socket directly on a PC motherboard. Furthermore, a special coprocessor or DSP often requires a dedicated software engineer knowledgeable to the specific instruction set Moreover, if the central processing unit (CPU) in the PC is upgraded to a faster version, for example, as in an internally clock-doubled part such as the Cx486DX2-80 microprocessor from the Cyrix Corporation (40 MHz bus–80 MHz core), the coprocessor or DSP remains at its predetermined clock rate and its programming (recursive filter) receives no performance boost Although the FM synthesis technique is a vast improvement over the primitive square wave oscillator technique originally equipped with the PC, it lacks, inter alia, accurate reproduction capability for percussion instruments and complex musical instruments like the piano. Consequently, the so-called "wavetable" synthesis technique emerged which doesn't use programmable carrier or modulator waveforms but rather, recalls and plays actual samples of real instruments (or other devices) which are stored in ROM, RAM, or hard disk. Unfortunately however, the vast body of application programs (software) developed under the "FM synthesis" I/O space standard are incompatible or cannot take advantage of the wavetable synthesis technique.

It can be seen from the foregoing therefore, that adherence to FM synthesis techniques cannot be easily abandoned without forfeiting legacy software. Accordingly, there is a need to provide realistic synthesized music and sound effects while maintaining compatibility with existing FM synthesis implementations. Additionally, there is a need to generate and capture audio without the need for an expansion sound card or otherwise specialized hardware.

SUMMARY OF THE INVENTION

To overcome the limitations of the prior art described above, and to overcome other limitations that will become apparent upon reading and understanding the present specification, the present invention discloses a computer system employing virtualized audio generation and capture, transparent to an application program being executed by a native central processing unit in the computer system, to generate and capture music and other sound effects, responsive to the occurrence of selective events.

In virtualized audio generation, an event trap mechanism invokes a system management mechanism to service events occurring in an application program executed by the native central processing unit which are intended to generate audio—all of which is transparent to the application program.

In virtualized audio capture, a data buffer invokes a system management mechanism to process incoming digitized data representative of audio and to integrate the digitized data into an application program or to simply playback the data.

A feature of the present invention is producing or capturing with a native central processing unit, music or sound effects without the aid of a dedicated FM synthesizer integrated circuit or a separate general purpose or digital signal coprocessor.

Another feature of the present invention is a high degree of integration and amortization of native central processing unit bandwidth to run both application software and to virtualize audio generation and capture.

Another feature of the present invention is direct efficiency dependency of the virtualized audio generation and capture on native central processing unit speed.

Another feature of the present invention is that virtualized audio generation and capture is independent of the operating system.

Another feature of the present invention is that virtualized audio generation and capture does not require any special memory management handlers.

Another feature of the present invention is complex audio generation without undesirable oscillations through the use of an open loop approach.

Another feature of the present invention is ease of upgrading new virtualized audio generation and capture programming.

Another feature of the present invention is minimal impact on the manufacturing cost of the computer system.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of virtualized audio generation and capture in a computer system, practiced in accordance with the present invention.

DESCRIPTION OF THE PREFERRED EMBODIMENT

Figure 1:
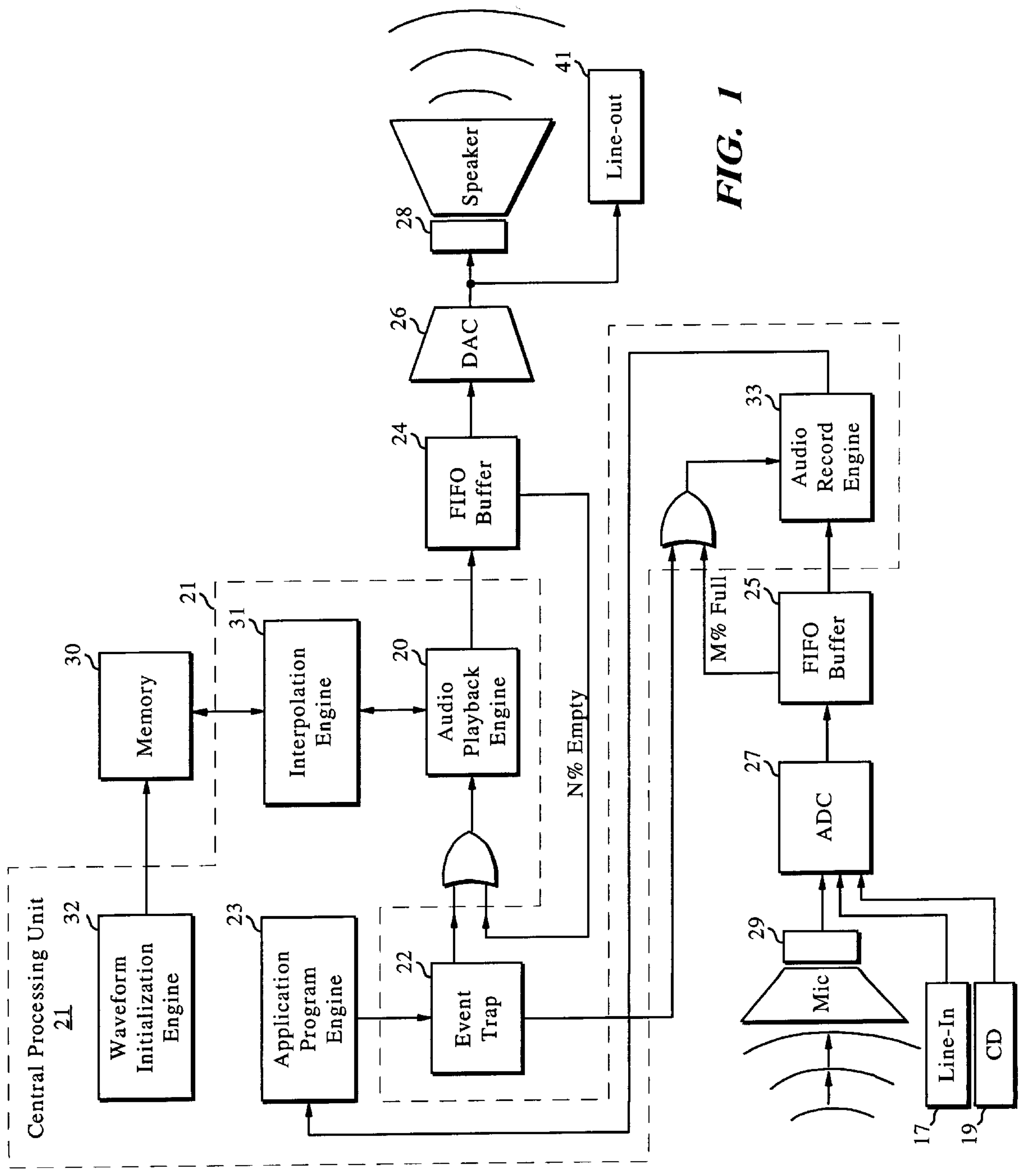
FIG. 1 is a general block diagram of a computer system employing virtualized audio generation and capture, practiced in accordance the principles of the present invention.
Figure 2A:
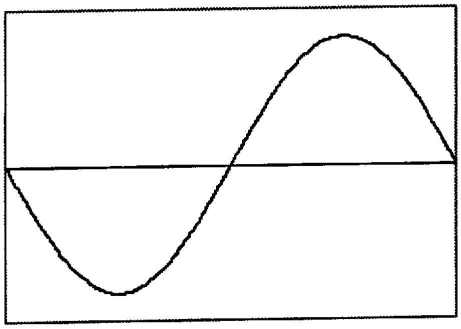
FIGS. 2(*a*)–(*h*) is a diagram of a first preferred group of predetermined waveforms stored in the memory of FIG. 1.
Figure 2B:
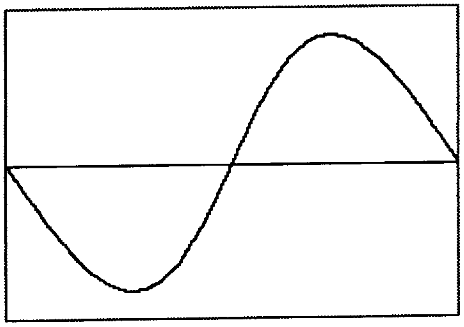
Figure 2C:
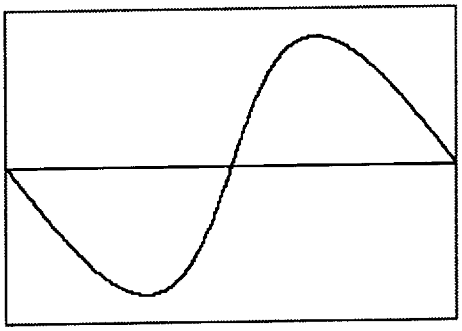
Figure 2D:
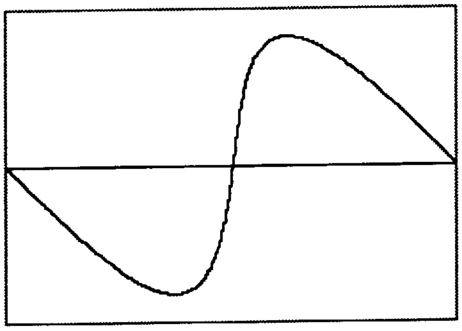
Figure 2E:
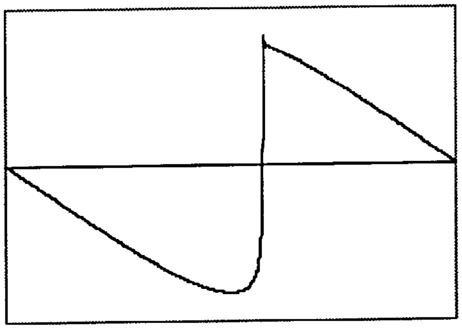
Figure 2F:
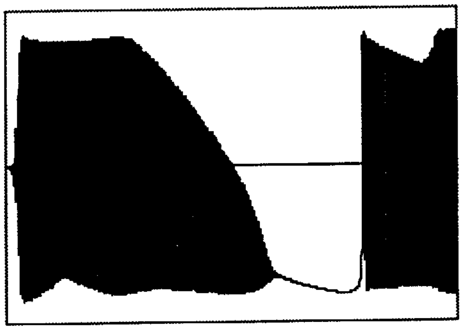
Figure 2G:
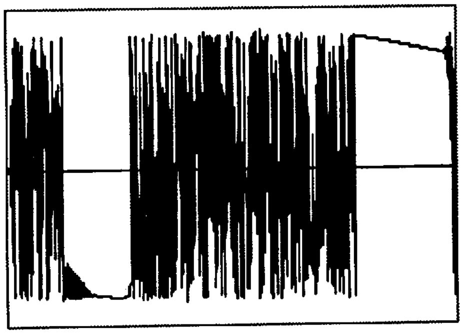
Figure 2H:
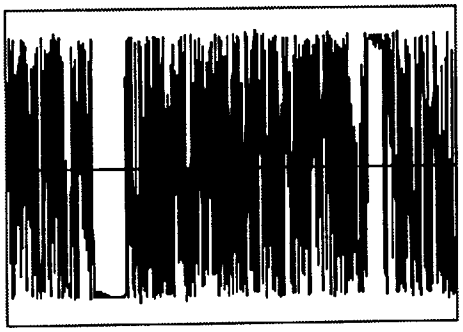
Figure 3A:
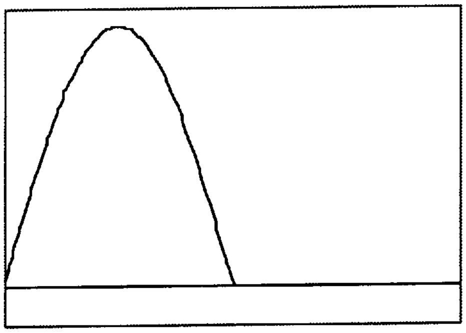
FIGS. 3(*a*)–(*g*) is a diagram of a second preferred group of predetermined waveforms stored in the memory of FIG. 1.
Figure 3B:
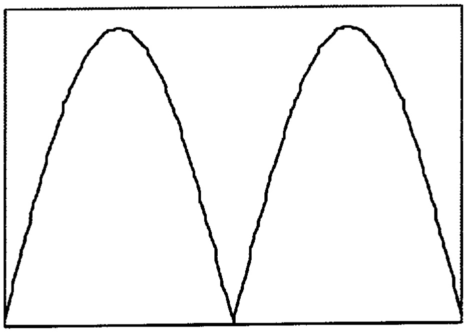
Figure 3C:
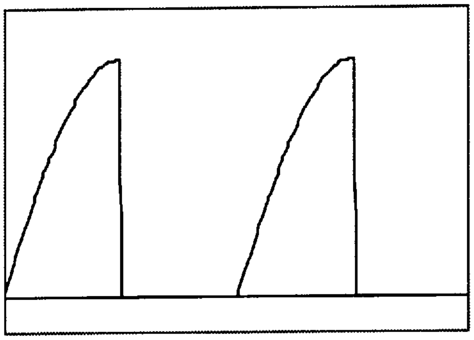
Figure 3D:
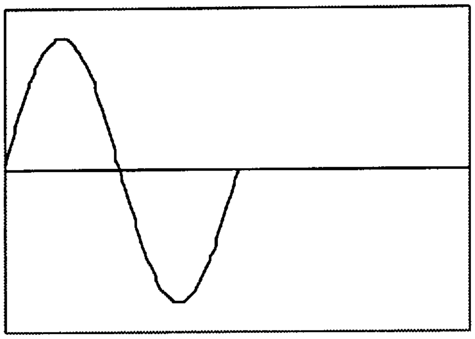
Figure 3E:
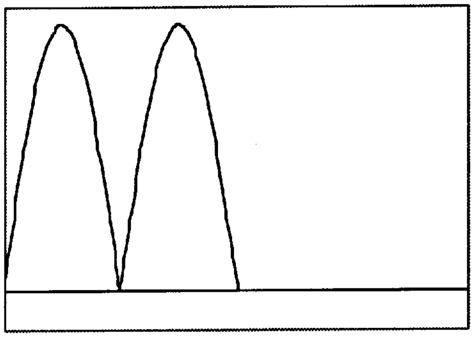
Figure 3F:
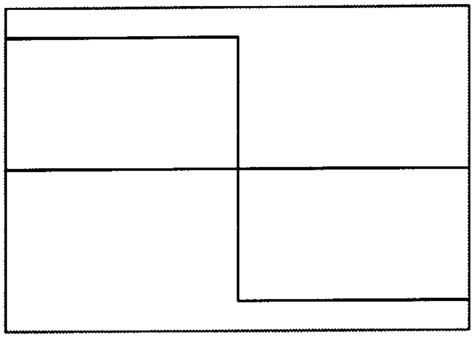
Figure 3G:
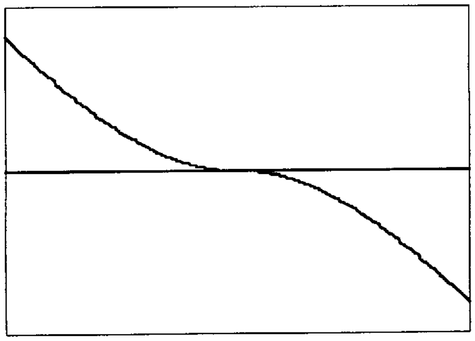

The detailed description of the preferred embodiment for the present invention is organized as follows:

1. Computer System Employing Virtualized Audio Generation and Capture
   1.1 Virtualized Audio Generation
   1.2 Virtualized Audio Capture
2. Process Flow For Virtualized Audio Generation and Capture
   2.1 Audio I/O Handler
   2.2 FIFO Handler For Audio Playback
   2.3 FIFO Handler For Audio Record
3. Unit Generator
   3.1 Envelope Generation
4. Coupling Unit Generators Together
5. Conclusion This organizational table, and the corresponding headings used in this detailed description, are provided for the convenience of reference only and are not intended to limit the scope of the present invention.

In order not to obscure the disclosure with structural details which will be readily apparent to those skilled in the art having the benefit of the description herein, the structure, control, and arrangement of conventional circuits have been illustrated in the drawings by readily understandable block representations and schematic diagrams, showing and describing details that are pertinent to the present invention. Thus, the block and schematic diagram illustrations in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

Throughout the specification, it is to be understood that the term "engine" is used to describe a convenient functional program module that is processed "executed" by the central processing unit. It is also to be understood that a condition, event, or method of implementation of a function being "transparent to an application program" describes that the application program neither knows nor needs to know of the condition, event, or method of implementation of a function to execute or "run" properly.

1. Computer System Employing Virtualized Audio Generation and Capture

Reference is now made to FIG. 1 which depicts a general and simplified block diagram of a computer system employing virtualized audio generation and capture, practiced in accordance with the principles of the present invention. The computer system includes a central processing unit (CPU) 21, a memory 30, an output FIFO buffer 24, a digital-to-analog converter (DAC) 26, a speaker 28, a microphone 29, an analog-to-digital converter (ADC) 27, and an input FIFO buffer 25. The CPU 21 may execute a plurality of engines including, but not limited to, a waveform initialization engine 32, at least one application program engine 23, an interpolation engine 31, an audio playback virtualization engine 20, and an audio record virtualization engine 33, all described in more detail hereinbelow.

1.1 Virtualized Audio Generation

In playback mode, the CPU 21 executes or "runs" the audio playback virtualization engine 20, the at least one application program engine 23, the interpolation engine 31, and the waveform initialization engine 32. As described in more detail hereinbelow, two stimuli drive the audio playback virtualization engine 20 namely: (a) an occurrence of a predefined event in the application program which is detected by event trap mechanism 22 or (b) a signal from the output FIFO buffer 24 indicating that it is N% empty.

The output FIFO buffer 24 receives and queues data from the audio playback virtualization engine 20 and drives the DAC 26 which in turn drives the speaker 28 and/or a line-out output 41. The effective clock rate for the DAC 26 is determined by the size of the output FIFO buffer 24, the setting of the value for "N% empty", and the conversion time for the DAC 26.

In the preferred embodiment, the event trap mechanism 22 in playback mode is an I/O address comparator which detects and signals whenever a read or a write is attempted to a predetermined range of I/O addresses by the at least one application program engine 23. Those skilled in the art, with the aid of the present disclosure, however, will readily recognize other expedients for detecting events performed by the at least one application program engine 23, such as, but not limited to, OP-code detection, without departing from the scope of the present invention.

The memory 30 holds at least one predetermined waveform for use by the audio playback virtualization engine 20, described in more detail hereinbelow. The memory 30 preferably, although not exclusively, resides in the general purpose RAM or cache in the computer system. Alternatively, memory 30 can include a "seed" ROM holding a base or set of base waveforms from which one or more waveforms are constructed and stored in general purpose RAM or cache in the computer system, as described in more detail hereinbelow. Moreover, it should be understood that the memory 30 could be a separate ROM, EEPROM, or other memory element without departing from the scope of the present invention.

In the preferred embodiment however, the memory 30 resides in RAM and is initialized by waveform initialization engine 32 that preferably fills the memory 30 with the waveforms depicted in FIGS. 2(*a*)–(*h*)–3(*a*)–(*f*) . The initialization is preferably carried out in response to power-on/reset and through the execution of a program routine stored in the BIOS memory (not shown but well known to skilled artisans). Many methods are known for generating the waveforms depicted in FIGS. 2(*a*)–(*h*)–3(*a*)–(*f*), the exact details not being necessary for the understanding of the present invention.

Moreover, the interpolation engine 31 may interpolate between the waveforms depicted in FIGS. 2(*a*)–(*h*)–3(*a*)–(*f*), in an open loop fashion, to construct more waveforms. Additionally to economize on the size of memory 30, the interpolation engine 31 is preferably interposed between the memory 30 and the audio playback virtualization engine 20 to increase playback resolution. That is, in addition to deriving new waveforms, the interpolation engine 31 may generate data points between points stored in the memory 30 through linear interpolation or through an interpolation technique as substantially described in Col. 19, line 40 et seq. of U.S. Pat. No. 4,018,121, entitled "Method of Synthesizing a Musical Sound", issued Apr. 19, 1977, to Chowning, the entire patent herein incorporated by reference.

1.2 Virtualized Audio Capture

With reference still to FIG. 1, a microphone 29 captures and converts acoustic waves into analog electrical signals or alternatively, an analog line-in input 17 or an analog input from a compact disc (CD) 19 provides analog electrical signals. The analog electrical signals are converted into digital data by analog-to-digital converter 27. The digital data is queued by an input FIFO buffer 25 which generates an M% full signal to indicate its fullness. The M% full signal is an event trap mechanism for the capture "record" mode that invokes the audio record virtualization engine 33.

The audio record virtualization engine 33 receives and selectively feeds 23 (at a rate set by M% full) the digitized data to the at least one application program engine or simply plays back without application program engine 23 intervention through the audio generation virtualization engine 20.

2. Process Flow For Virtualized Audio Generation and Capture

Figure 4:
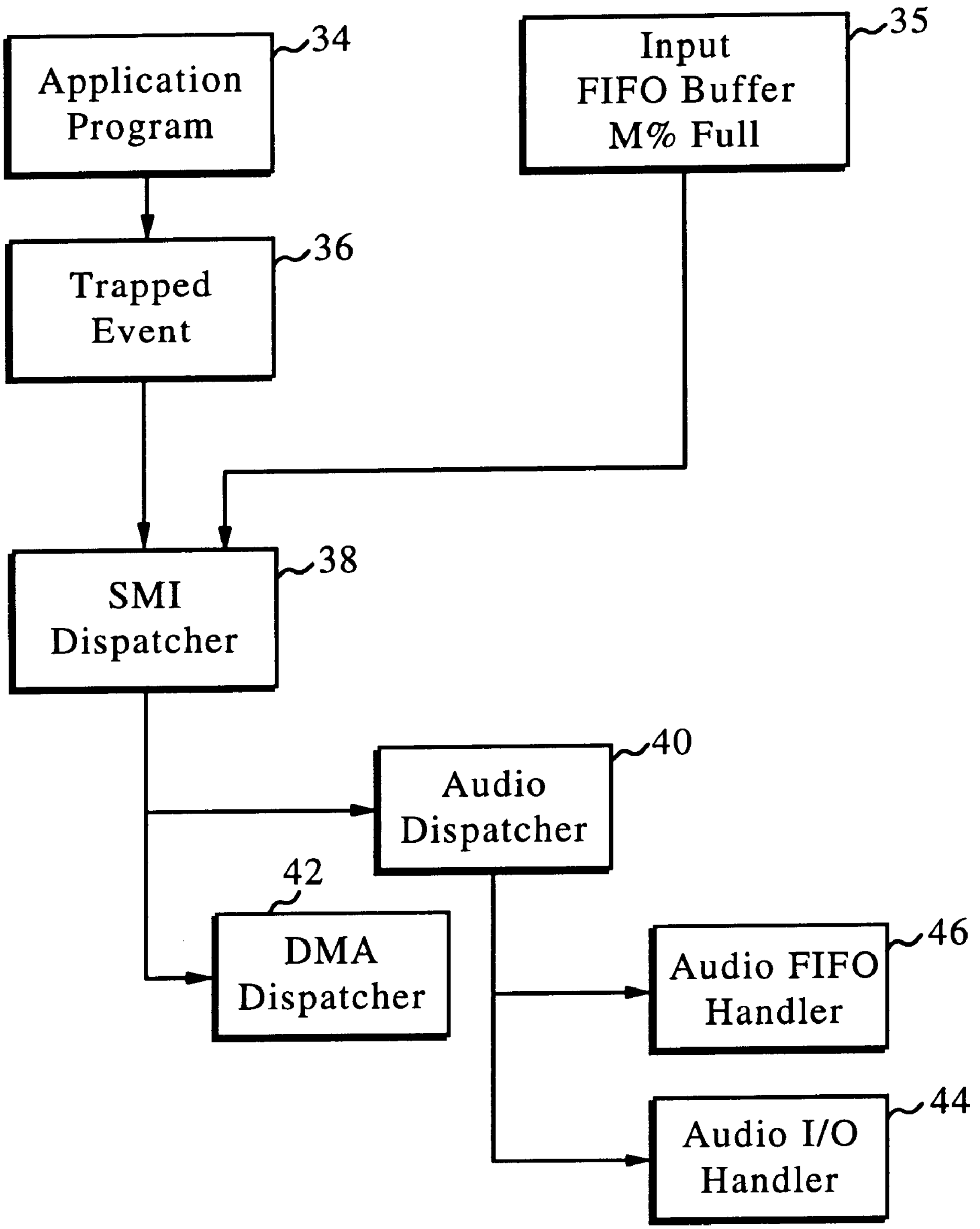
FIG. 4 is a flow diagram of the process employed by the system in FIG. 1.

Reference is now made to FIG. 4 which depicts a flow diagram of the process employed by the system of FIG. 1. At step 34 in the playback mode, application program preferably, although not exclusively, running under MS-DOS® or Microsoft® Windows™ operating systems, executes program instructions, one or more of which generates an event which is trapped at step 36. In the preferred embodiment, the trapped event at step 36 is a read or a write to a predefined I/O address space. The trapped event at step 36 invokes a system management interrupt (SMI) dispatcher at step 38.

In the capture (record) mode, the event at step 35 which invokes the system management interrupt (SMI) dispatcher at step 38 is the M% full signal from the input FIFO buffer 25. While any and all SMI techniques are contemplated for use with the present invention, the currently preferred mechanism for generating the SMI dispatcher at step 38 is disclosed in pending U.S. patent application Ser. No.: 08/388,127, filed Mar. 09, 1995, entitled "Enhanced System Management Method And Apparatus With Added Functionality", which is a file-wrapper-continuation of U.S. patent application Ser. No.: 08/062,014, which is a continuation-in-part application of U.S. patent application Ser. No.: 07/900,052, filed Jun. 17, 1992, all assigned to the Assignee of the present invention, and all herein incorporated by reference. Those skilled in the art will recognize with the aid of the present disclosure, other mechanisms for generating the SMI dispatcher at step 38 without departing from the scope of the present invention.

The SMI dispatcher at step 38 is bifurcated into an audio dispatcher at step 40 and a direct memory access (DMA) dispatcher at step 42. The audio dispatcher at step 40 preferably intercepts and processes I/O addresses **220-22*f*, 240-24*f*, 300-301, 330-331, and 388-38*b***, all expressed in hexadecimal. Those skilled in the art will recognize other I/O addresses without departing from the scope of the present invention.

The DMA dispatcher at step 42 preferably intercepts and processes "traps" I/O addresses at 00-0f and c0-df (DMA registers or "channels") so that the audio playback virtualization engine 20 can determine where in memory the application program expects audio to be read from ("playback") or where the audio record virtualization engine 33 is expected to write to ("recording"). The audio dispatcher at step 40 is subdivided into an audio I/O handler at step 44 and an audio FIFO handler at step 46, both discussed in more detail hereinbelow.

2.1 Audio I/O Handler

Figure 5:
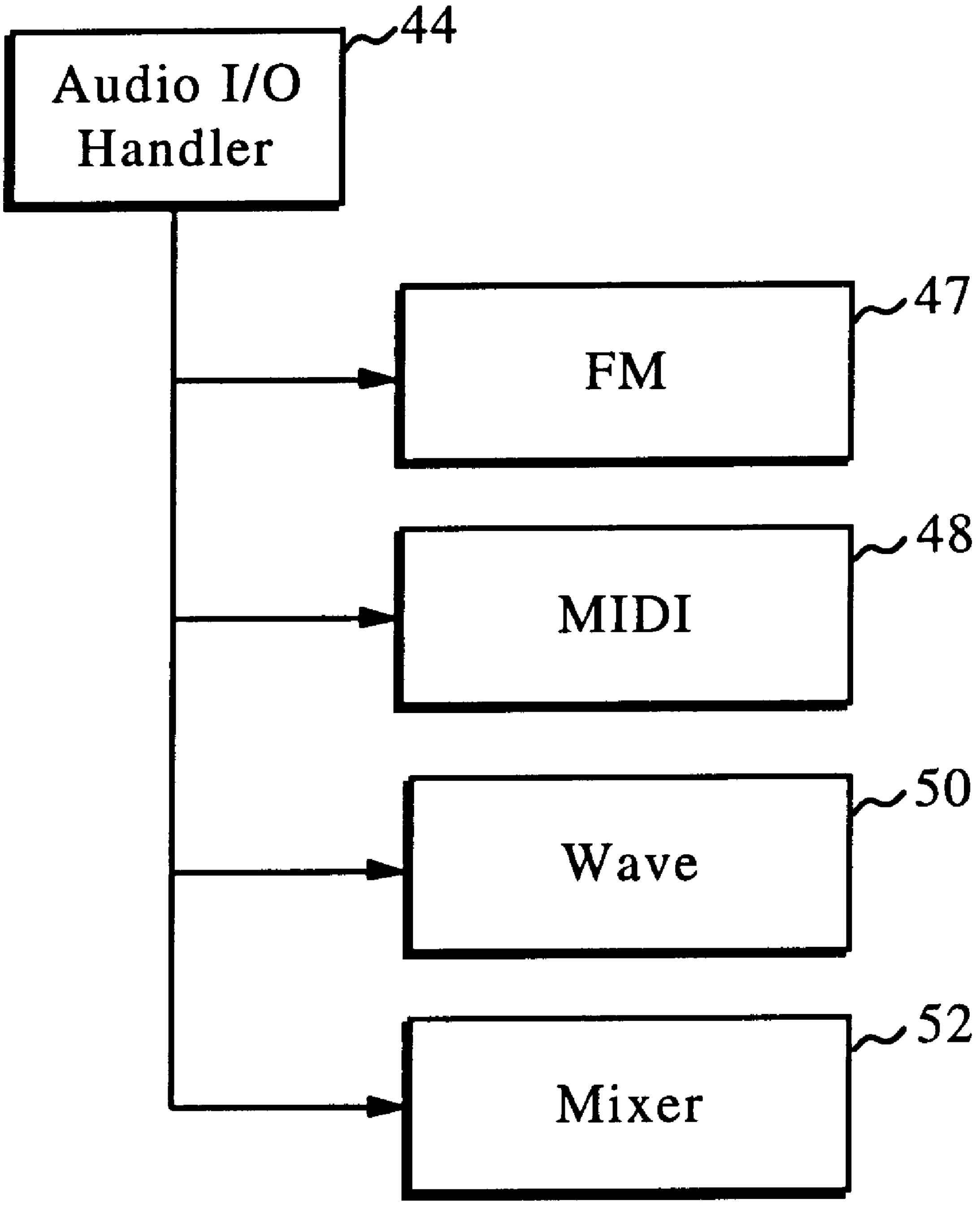
FIG. 5 is a more detailed flow diagram of the audio I/O handler process depicted in FIG. 4.

Reference is now made to FIG. 5 which depicts the audio I/O handler of step 44 in more detail. The audio I/O handler of step 44 is parsed into four virtual "sub-handlers" namely: an FM handler at step 47, a musical instrument digital interface (MIDI) handler at step 48, a wave handler at step 50, and a mix buffer handler at step 52. Each of the respective sub-handlers 47–52 first determines whether the trapped event applies to it and whether it is an I/O read or write operation. For example, in the preferred embodiment, if the I/O address falls within the range of 388-**38*b* then the FM handler is invoked at step 47. Likewise the MIDI handler at step 48 is invoked if the I/O address falls within the ranges 300–301 and 330–331. The wave handler at step 50 is invoked if the I/O address falls within the range of 220-22*f* and 240-24*f*. The mix buffer handler at step 52 is invoked if the I/O address falls within the range of 224–225 and 244–245**.

If the trapped event was an I/O read, the data is either retrieved from a primary data store (memory 30) or is requested from a secondary data store such as a hard disk drive. The requested data is then returned through the SMI dispatcher of step 38 and the application program 34 is resumed by the application program engine 23. If the trapped event is an I/O write, the appropriate engine, as described hereinbelow, is invoked.

2.2 FIFO Handler For Audio Playback

Figure 6:
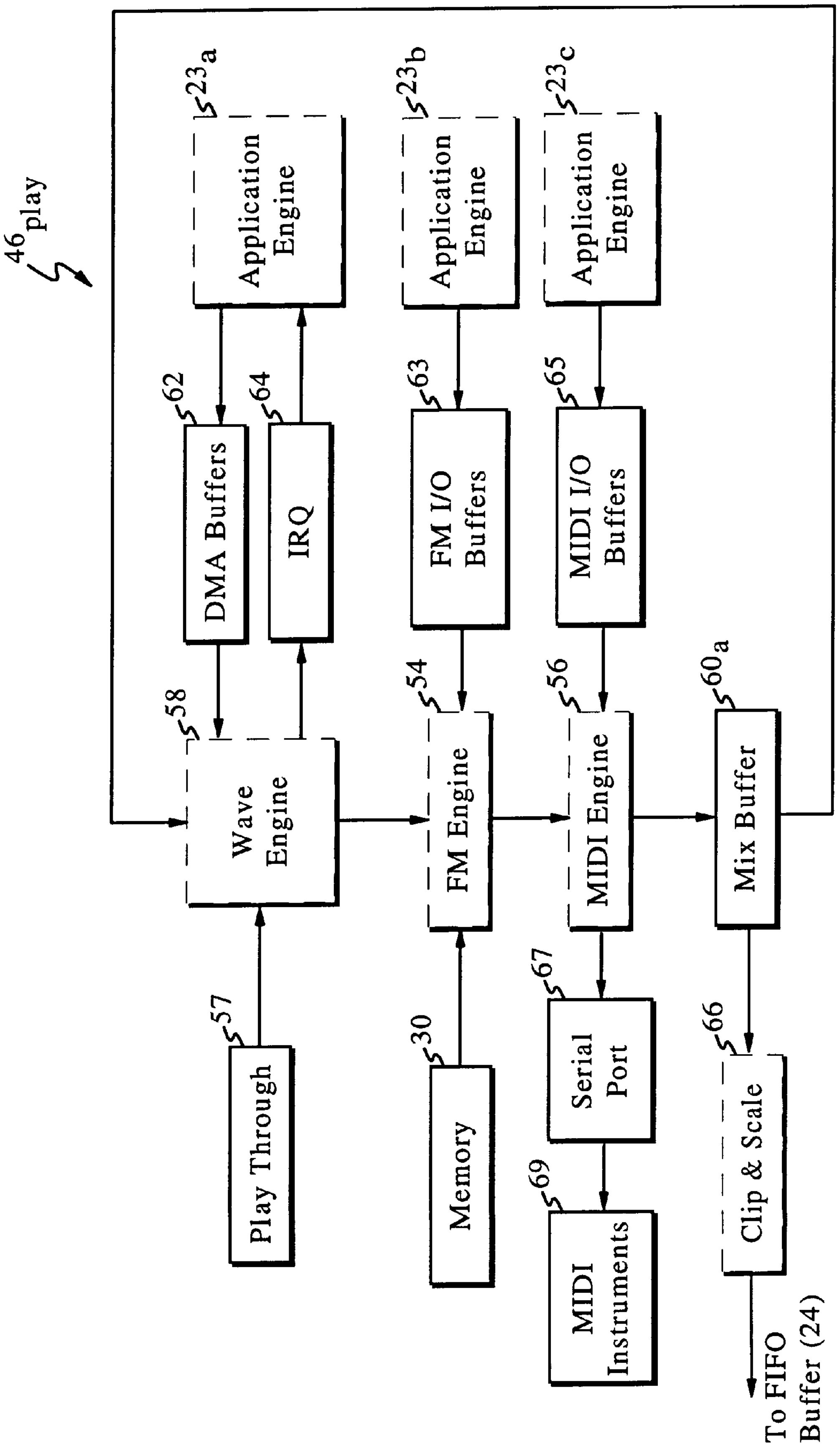
FIG. 6 is a more detailed flow diagram of the audio FIFO handler process depicted in FIG. 4 for playback.

Reference is now made to FIG. 6 which depicts a more detailed flow diagram of the audio FIFO handler process of step 46 for playback ($\mathbf{46}_{play}$). The dashed boxes indicate program (code) flow while the solid boxes indicate data flow. A wave engine 58, an FM engine 54, and a MIDI engine 56, are selectively invoked in response to one of the virtual sub-handlers under the audio I/O handler of step 44. The wave engine 58 receives data through DMA buffers 62 and generates interrupt requests to application program engine $\mathbf{23}_a$ through interrupt request controller 64.

The FM engine 54 receives commands from application program engine $\mathbf{23}_b$ through FM I/O buffers 63 and data from memory 30. The MIDI engine 56 receives MIDI commands from application program engine $\mathbf{23}_c$ through MIDI I/O buffers 65. The MIDI engine 56 transmits the MIDI commands through a serial port 67 to other MIDI instruments 69 which are daisy-chained together with the serial port 67 in accordance with the MIDI protocol. The MIDI engine 56 may also interpret the MIDI commands indexed by the application program engine $\mathbf{23}_c$ by retrieving sampled waveforms of real instruments or other digitized sound effects from a ROM (not shown) or from RAM (down-loaded from disk) in response thereto. The exact details of MIDI engine 56 are not necessary for the understanding of the present invention. It should be understood, however, that it contemplated that MIDI engine 56 would utilize an existing MIDI Application Program Interface (API) such as under the Microsoft® Windows™ operating system for the application program engine $\mathbf{23}_c$.

The mix buffer 60 mixes together its previous contents with inputs from the FM engine 54, the MIDI engine 56, and the wave engine 58. The Clip and Scale engine 66 programmably clips (limits) and attenuates to maximum positive or negative, the contents of the mix buffer 60. The FM engine 54, the MIDI engine 56, and the wave engine 58 may also attenuate their output data before summing into the Mix buffer 60.

2.3 FIFO Handler For Audio Record

Figure 7:
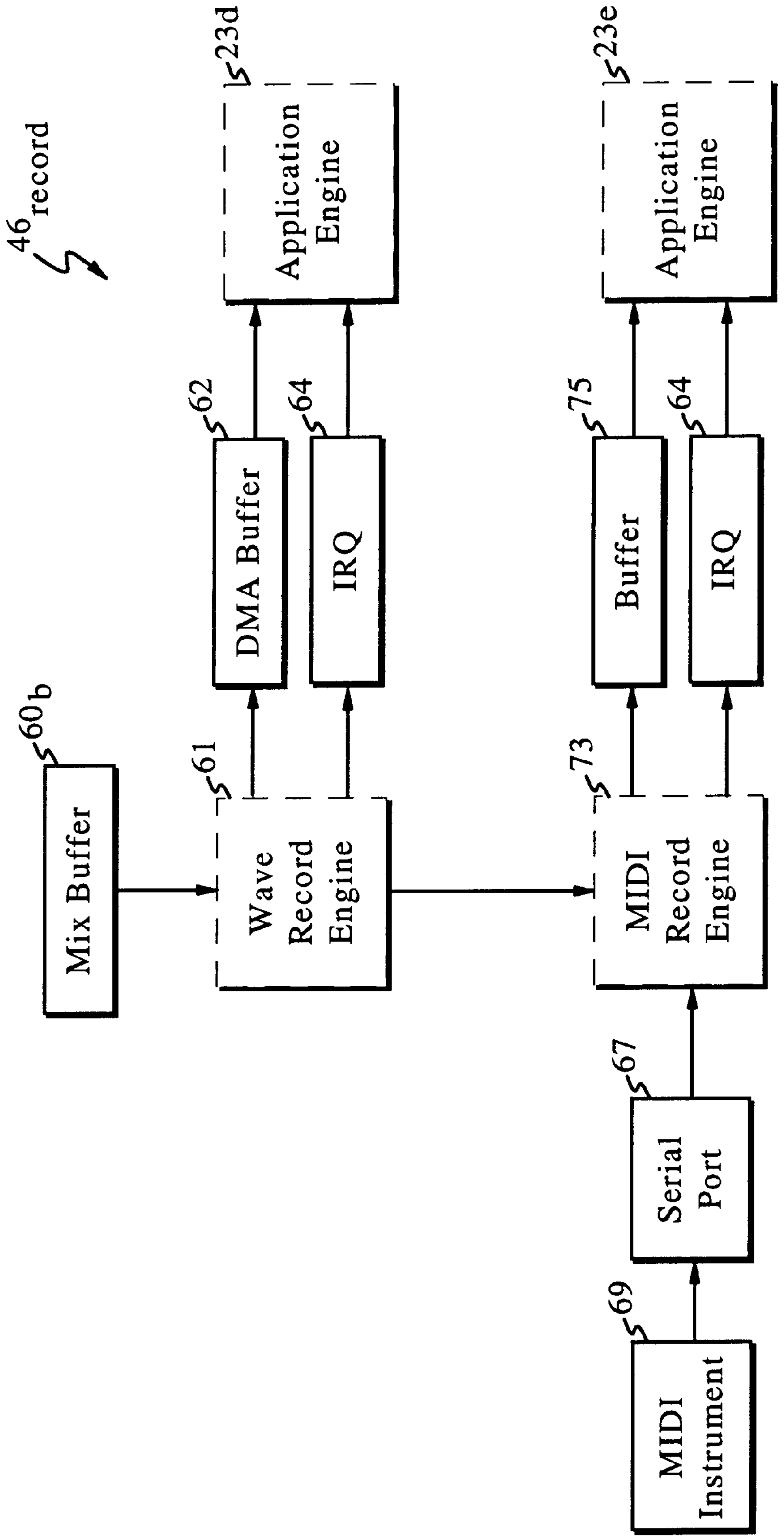
FIG. 7 is a more detailed flow diagram of the audio FIFO handler process depicted in FIG. 4 for record.

Reference is now made to FIG. 7 which depicts a more detailed flow diagram of the audio FIFO handler process of step 46 for recording ($\mathbf{46}_{record}$). The dashed boxes indicate program (code) flow while the solid boxes and lines indicate data flow. Wave record engine 61 receives audio data from mix buffer $\mathbf{60}_b$ and transmits the data through DMA buffers 62 and generates interrupt requests to application program engine $\mathbf{23}_d$ through interrupt request controller 64.

Similarly, the MIDI record engine 71 receives MIDI commands from MIDI instruments 69 through the serial port 67 in accordance with the MIDI protocol. The MIDI commands are passed on to the application program engine $\mathbf{23}_e$ through buffers 75 and interrupt request controller 64.

3. Unit Generator

Figure 8:
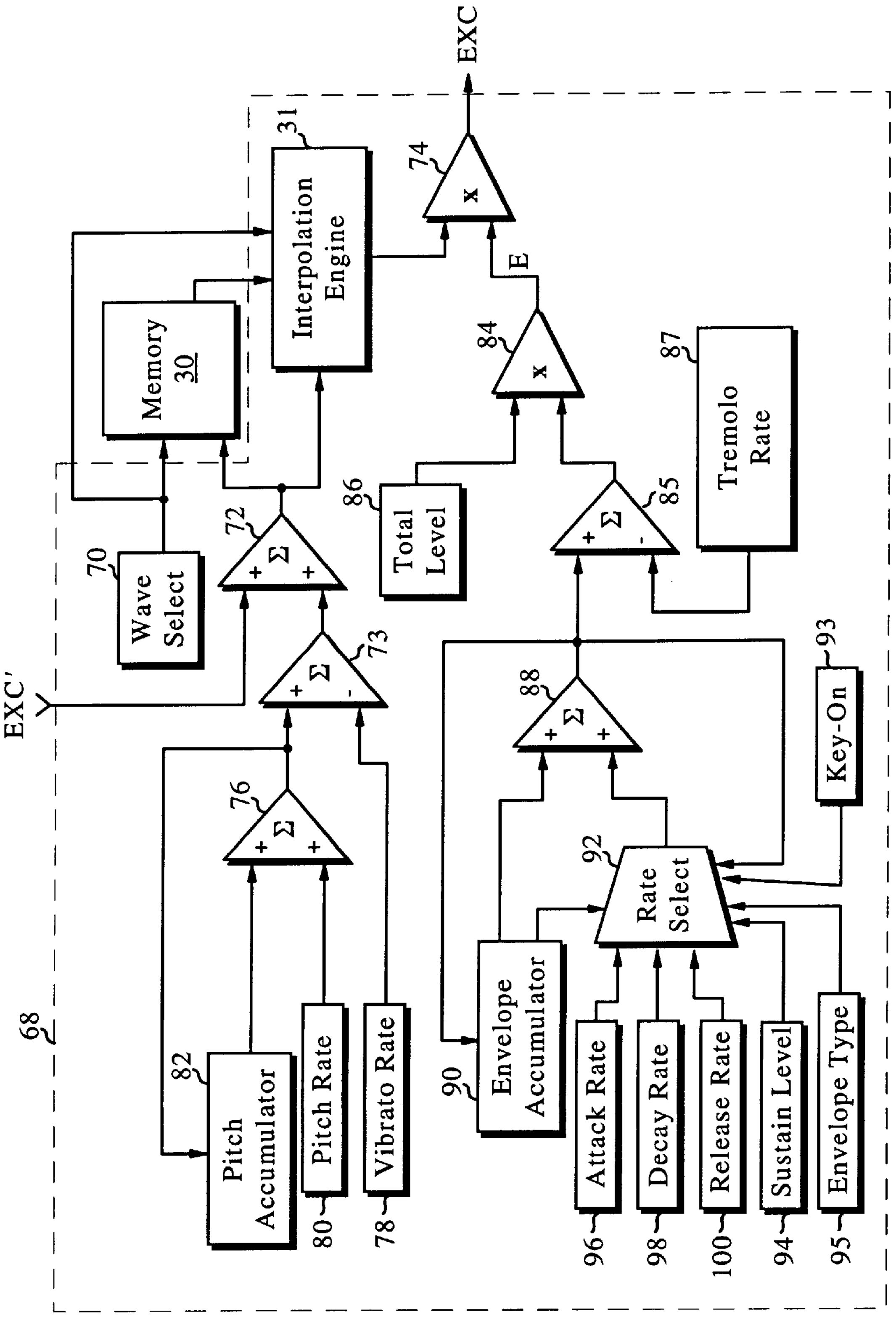
FIG. 8 is a block diagram of a unit generator employed in the FM engine depicted in FIG. 6.

Reference is now made to FIG. 8 which depicts a block diagram of a single unit generator 68 that is used in forming embodiments of the FM engine 54 depicted in FIG. 6. It is to be understood that the term "unit generator" refers to a convenient grouping of program code or modules used in constructing the FM engine 54 and that programmable registers described herein are preferably programmed through the FM I/O handler 47 described above and illustrated in FIG. 5.

The unit generator 68 includes a programmable wave select register 70 for pointing to a base waveform stored in memory 30. A digital adder 72 selects a single memory location within the base waveform pointed to by wave select register 70. The contents of two or more memory locations selected by digital adder 72 are preferably interpolated between by interpolation engine 31 and then digitally multiplied with a value (E) by digital multiplier 74 to produce the excitation output waveform EXC. Additionally the interpolation engine 31 can construct additional waveforms by selectively combining data from the wave select register 70 (one or more waveforms in FIGS. 2 and 3) and data from the digital adder 72.

Digital adder 72 receives a first input from digital adder 73 and an optional second input EXC' from a previous or subsequent unit generator, described in more detail hereinbelow. Digital adder 73 receives a first input from digital adder 76 and a second input from a programmable vibrato rate register 78. Digital adder 76 receives a first input from a programmable pitch rate register 80 and a second input from a pitch accumulator 82. The pitch accumulator 82 accumulates the output from digital adder 76.

The multiplier value (E) originates from digital multiplier 84 having a first input coupled to a programmable total level register 86 and a second input coupled to the output of digital adder 85. Digital adder 85 has a first input coupled to a programmable tremolo rate register 87 and a second input coupled to an output on digital adder 88.

The digital adder 88 has a first input coupled to an envelope accumulator 90 and a second input coupled to a rate select multiplexer 92. The envelope accumulator 90 accumulates the output from digital adder 88. The rate select multiplexer 92 is controlled by: the envelope accumulator 90, a programmable sustain level register 94, a programmable envelope type register 95, key-on event indicator 93, and the output of digital adder 88—which select one of the values stored in programmable attack rate register 96, programmable decay rate register 98, or programmable release rate register 100.

3.1 Envelope Generation

Figure 15:
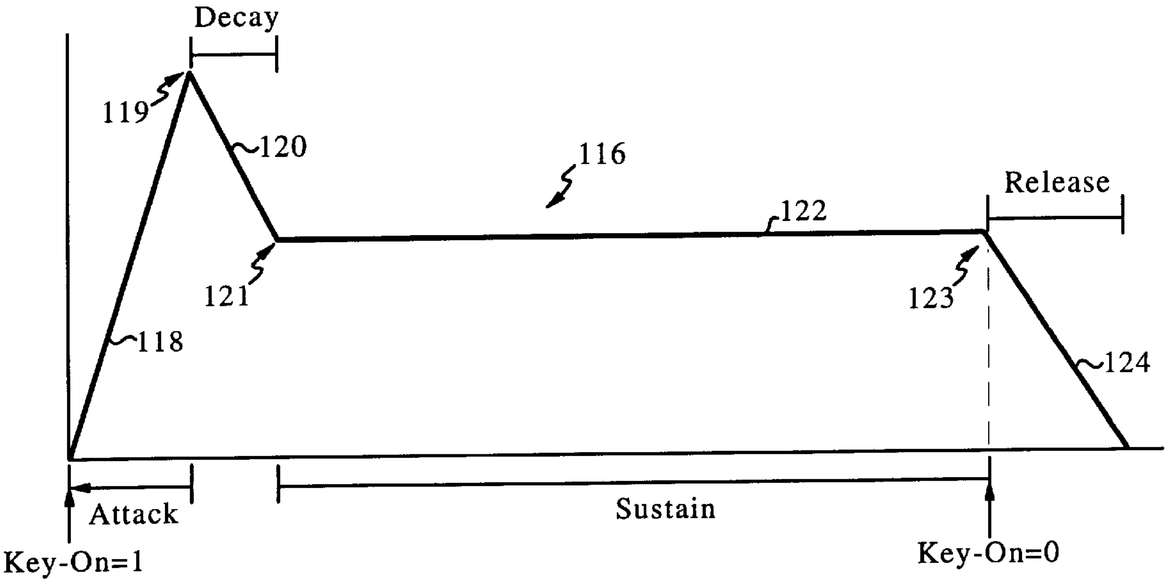

Reference is now made to FIG. 15 in conjunction with FIG. 8 which depicts an exemplary envelope 116 produced by the unit generator 68. The programmable envelope type register 95 determines if the envelope 116 switches to release before or after the key-on event indicator 93 is removed. The key-on event indicator 93 initiates the attack sequence while the programmable attack rate register 96 sets the attack slope 118. The programmable envelope accumulator 90 switches rate select multiplexer 92 over from the programmable attack rate register 96 to the programmable decay rate register 98—causing the envelope 116 to switch at point 119. The programmable decay rate register 98 sets the decay slope 120. The output of digital adder 88 is compared to the programmable sustain level register 94 causing the rate select multiplexer 92 to switch the envelope at point 121 when an equality exists. The sustain level is maintained until point 123 wherein the key-on event indicator 93 is removed and rate select multiplexer 92 selects programmable release rate register 100. The programmable release rate register 100 sets the release slope 124.

4. Coupling Unit Generators Together

Two or more unit generators can be programmably combined together to form so-called "complex instrument voices". That is, the excitation output EXC produced by each unit generator can either drive the optional second input EXE' into digital adder 72, be digitally added with the excitation output of one or more other unit generators, or a combination of both. The coupling of unit generators is preferably achieved through a programmable register (not shown) whose programming is achieved through the FM I/O handler 47 described above and illustrated in FIG. 5.

Figure 9:
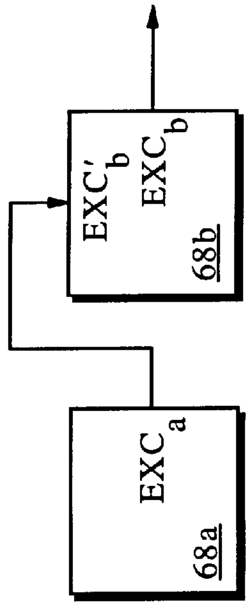
FIG. 9 is a first alternative embodiment for coupling a plurality of unit generators depicted in FIG. 8 to form the FM engine depicted in FIG. 6.

Reference is now made to FIG. 9 which depicts a first alternative embodiment for coupling two unit generators together. The excitation output of a first unit generator $\mathbf{68}_a$ is cascaded into the optional second input ($EXC_b'$) of digital adder $\mathbf{72}_b$ on a second unit generator $\mathbf{68}_b$. The excitation output of the second unit generator $\mathbf{68}_b$ drives the FIFO buffer 24.

Figure 10:
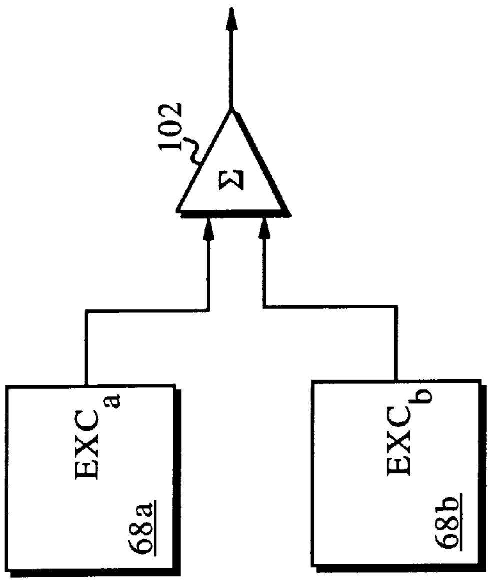
FIG. 10 is a second alternative embodiment for coupling a plurality of unit generators depicted in FIG. 8 to form the FM engine depicted in FIG. 6.

Reference is now made to FIG. 10 which depicts a second alternative embodiment for coupling two unit generators together. The excitation output of a first unit generator $\mathbf{68}_a$ is added with the excitation output of a second unit generator $\mathbf{68}_b$ by digital adder 102. The output of the digital adder 102 drives the FIFO buffer 24.

Figure 11:
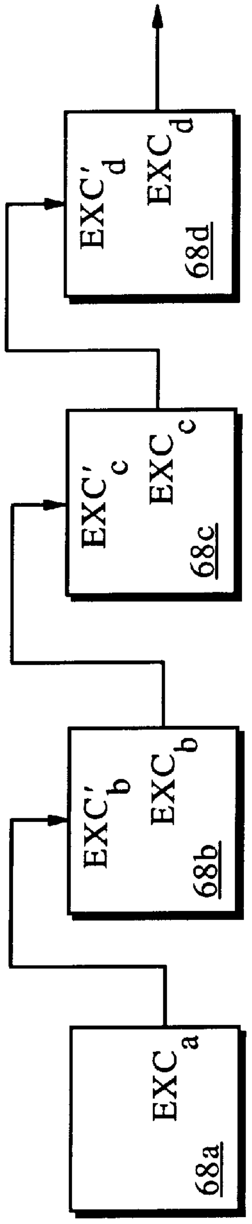
FIG. 11 is a third alternative embodiment for coupling a plurality of unit generators depicted in FIG. 8 to form the FM engine depicted in FIG. 6.

Reference is now made to FIG. 11 which depicts a third alternative embodiment for coupling a plurality of unit generators together. The excitation output of a first unit generator $\mathbf{68}_a$ is cascaded into the optional second input ($EXC_b'$) of digital adder $\mathbf{72}_b$ on a second unit generator $\mathbf{68}_b$. The excitation output of the unit generator $\mathbf{68}_b$ is cascaded into the optional second input ($EXC_c'$) of digital adder $\mathbf{72}_c$ on a third unit generator $\mathbf{68}_c$. The excitation output of the third unit generator $\mathbf{68}_c$ is cascaded into the optional second input ($EXC_d'$) of digital adder $\mathbf{72}_d$ on a fourth unit generator $\mathbf{68}_d$. The excitation output of the fourth unit generator $\mathbf{68}_d$ drives the FIFO buffer 24.

Figure 12:
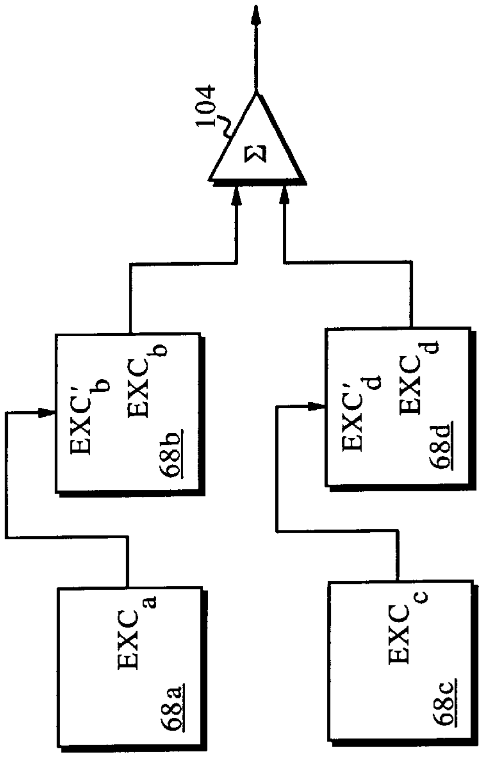
FIG. 12 is a fourth alternative embodiment for coupling a plurality of unit generators depicted in FIG. 8 to form the FM engine depicted in FIG. 6.

Reference is now made to FIG. 12 which depicts a fourth alternative embodiment for coupling a plurality of unit generators together. The excitation output of a first unit generator $\mathbf{68}_a$ is cascaded into the optional second input ($EXC_b'$) of digital adder $\mathbf{72}_b$ on a second unit generator $\mathbf{68}_b$. The excitation output of a third unit generator $\mathbf{68}_c$ is cascaded into the optional second input ($EXC_d'$) of digital adder $\mathbf{72}_d$ on a fourth unit generator $\mathbf{68}_d$. The excitation outputs of the second and fourth unit generators $\mathbf{68}_b$ and $\mathbf{68}_d$ respectively, are digitally added together by digital adder 104. The output of the digital adder 104 drives the FIFO buffer 24.

Figure 13:
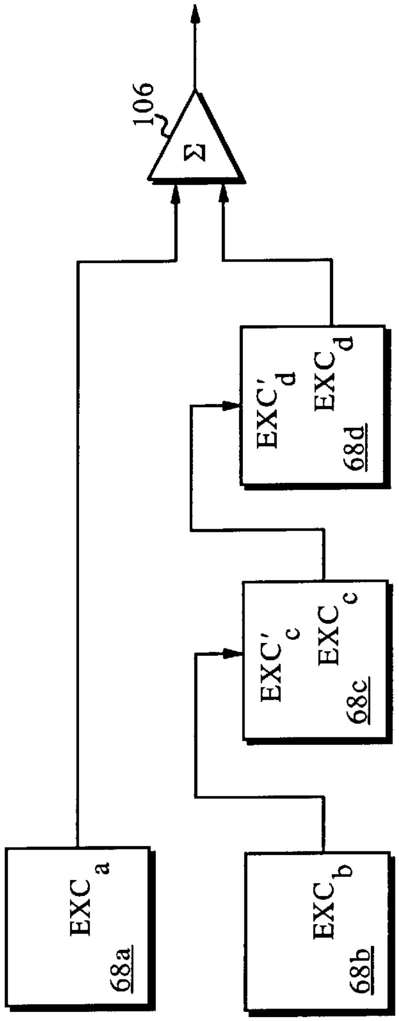
FIG. 13 is a fifth alternative embodiment for coupling a plurality of unit generators depicted in FIG. 8 to form the FM engine depicted in FIG. 6.

Reference is now made to FIG. 13 which depicts a fifth alternative embodiment for coupling a plurality of unit generators. The excitation output of a second unit generator $\mathbf{68}_b$ is cascaded into the optional second input ($EXC_c'$) of digital adder $\mathbf{72}_c$ on a third unit generator $\mathbf{68}_c$. The excitation output of the third unit generator $\mathbf{68}_c$ is cascaded into the optional second input ($EXC_d'$) of digital adder $\mathbf{72}_d$ on a fourth unit generator $\mathbf{68}_d$. The excitation outputs of a first unit generator $\mathbf{68}_a$ and the fourth unit generator $\mathbf{68}_d$ are digitally added together by digital adder 106. The output of the digital adder 106 drives the FIFO buffer 24.

Figure 14:
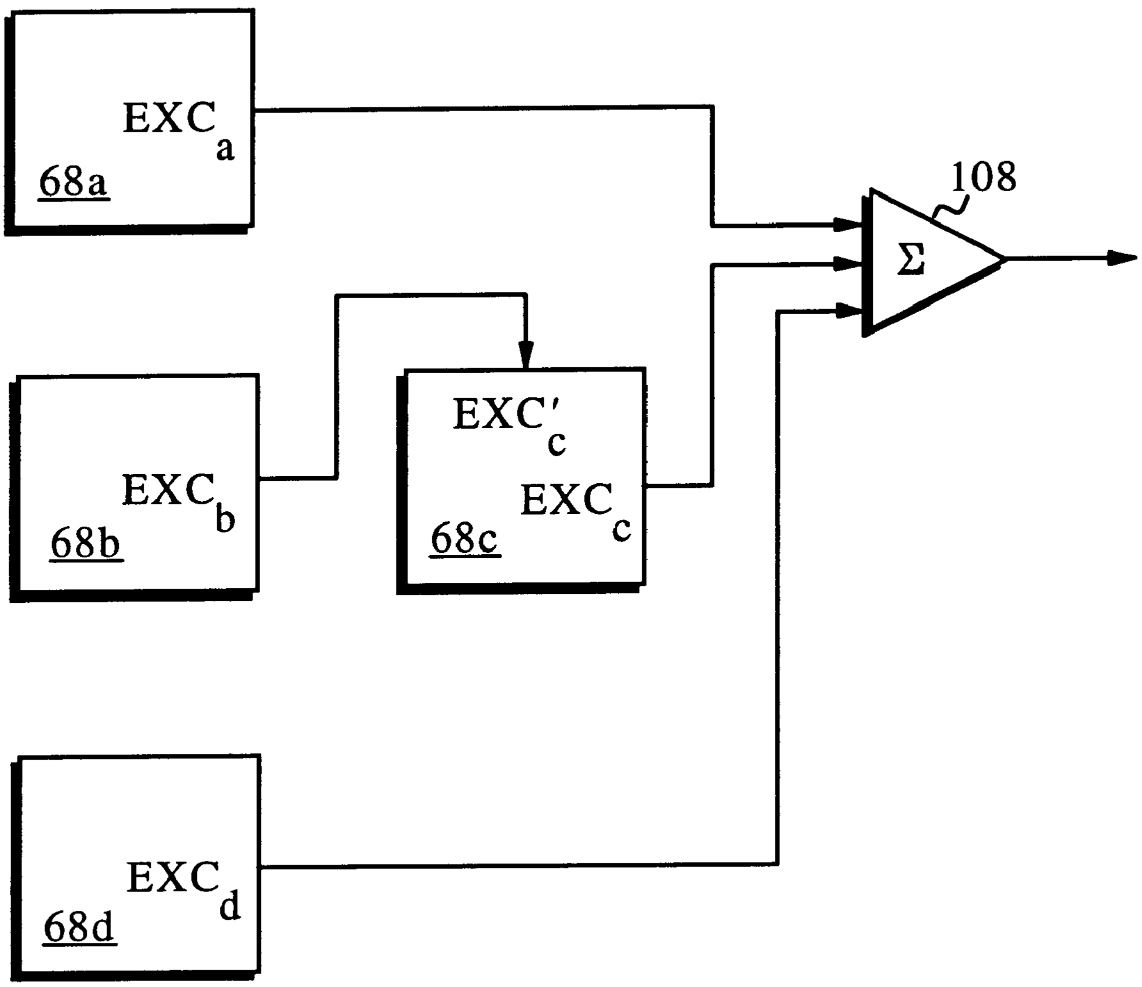
FIG. 14 is a sixth alternative embodiment for coupling a plurality of unit generators depicted in FIG. 8 to form the FM engine depicted in FIG. 6; and, FIG. 15 is an exemplary envelope waveform generated with the unit generator depicted in FIG. 8.

Reference is now made to FIG. 14 which depicts a sixth alternative embodiment for coupling a plurality of unit generators together. The excitation output of a second unit generator $\mathbf{68}_b$ is cascaded into the optional second input ($EXC_c'$) of digital adder $\mathbf{72}_c$ on a third unit generator $\mathbf{68}_c$. The excitation outputs of a first unit generator 68*a*, the third unit generator $\mathbf{68}_c$, and a fourth unit generator $\mathbf{68}_d$ are digitally added together by digital adder 108. The output of the digital adder 108 drives the FIFO buffer 24.

5. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the Claims.

What is claimed is:

1. A computer system having virtualized audio generation and capture functions without a sound card, comprising:

a) a central processing unit;

b) a memory to store a plurality of data points representative of at least one waveform;

c) an event trap mechanism, coupled to the central processing unit, that signals an occurrence of a predefined event; and, d) an audio virtualization engine, responsive to the event trap mechanism, to divert the central processing unit to either read incoming digitized data or at least some of the plurality of data points representative of at least one waveform and to provide data representative of a desired audio output.

2. A computer system as recited in claim 1 wherein the predefined event is a read or a write to a predetermined range of I/O addresses.

3. A computer system as recited in claim 1 further comprising an input buffer for queuing incoming digitized data.

4. A computer system as recited in claim 3 wherein the predefined event is an indication from the input buffer.

5. A computer system as recited in claim 1 wherein the event trap mechanism invokes a system management interrupt.

6. A computer system as recited in claim 1 further comprising an analog-to-digital converter for supplying the incoming digitized data.

7. A computer system as recited in claim 6 further comprising a microphone coupled to the analog-to-digital converter.

8. A computer system as recited in claim 6 further comprising a line-in input coupled to the analog-to-digital converter.

9. A computer system as recited in claim 6 further comprising a compact disc input coupled to the analog-to-digital converter.

10. A computer system as recited in claim 1 further comprising an interpolation engine, coupled to the memory, to interpolate points between at least two data points in the plurality of data representative of at least one waveform.

11. A computer system as recited in claim 1 further comprising a waveform initialization engine, coupled to the memory, to initialize the memory.

12. A computer system as recited in claim 1 further comprising a FIFO buffer, responsive to the audio virtualization engine, to queue the data representative of the desired audio output.

13. A computer system as recited in claim 12 further comprising a digital-to-analog converter coupled to the FIFO buffer.

14. A computer system as recited in claim 13 further comprising a speaker coupled to the digital-to-analog converter.

15. A computer system as recited in claim 1 further comprising a MIDI engine to generate audio by selecting a predetermined waveform from memory responsive to receiving and interpreting MIDI instructions.

16. A computer system with virtualized audio generation and capture functions without a sound card, comprising:

a) a central processing unit that processes at least one application program;

b) a memory to store a plurality of data points representative of at least one waveform;

c) an event trap mechanism, coupled to the central processing unit, to signal an occurrence of a predefined event in the at least one application program; and, d) an audio virtualization engine, responsive to the event trap mechanism, to divert the central processing unit to read at least some of the plurality of data points representative of at least one waveform and to provide data representative of a desired audio output.

17. A computer system as recited in claim 16 further comprising an interpolation engine, coupled to the memory, to interpolate points between at least two data points in the plurality of data representative of at least one waveform.

18. A computer system as recited in claim 16 further comprising a waveform initialization engine, coupled to the memory, to initialize the memory.

19. A computer system as recited in claim 16 further comprising a FIFO buffer, responsive to the audio virtualization engine, to queue the data representative of the desired audio output.

20. A computer system as recited in claim 19 further comprising a digital-to-analog converter coupled to the FIFO buffer.

21. A computer system as recited in claim 20 further comprising a speaker coupled to the digital-to-analog converter.

22. A computer system as recited in claim 16 further comprising a MIDI engine to generate audio by selecting a predetermined waveform from memory responsive to receiving and interpreting MIDI instructions.

23. A computer system with virtualized audio generation and capture functions without a sound card, comprising:

a) storage means for storing a plurality of data points representative of at least one waveform;

b) event trap means for collecting information in response to an occurrence of at least one predetermined event;

c) lookup means, responsive to the event trap means, for reading the storage means; and, d) means, responsive to the lookup means, for producing a sound.

24. A computer system as recited in claim 23 further comprising interpolation means, coupled to the storage means, for interpolating between at least two data points in the plurality of data points representative of at least one waveform.

25. A computer system as recited in claim 23 further comprising initialization means, coupled to the storage means, for initializing the storage means with at least one waveform.

26. A computer system as recited in claim 23 further comprising MIDI means, responsive to receiving and interpreting MIDI instructions, for selecting a predetermined waveform from the storage means and generating an audio tone.

* * * * *